(12) United States Patent
Kawazu et al.

(10) Patent No.: US 11,423,139 B2
(45) Date of Patent: Aug. 23, 2022

(54) INFORMATION PROCESSING APPARATUS, INFORMATION PROCESSING METHOD, AND STORAGE MEDIUM FOR PREVENTING UNAUTHORIZED REWRITING OF A MODULE

(71) Applicant: CANON KABUSHIKI KAISHA, Tokyo (JP)

(72) Inventors: Ayuta Kawazu, Yokohama (JP); Nobuhiro Tagashira, Nagareyama (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 16/908,434

(22) Filed: Jun. 22, 2020

(65) Prior Publication Data
US 2020/0410087 A1 Dec. 31, 2020

(30) Foreign Application Priority Data
Jun. 27, 2019 (JP) .............................. JP2019-120326

(51) Int. Cl.
*G06F 21/52* (2013.01)
*G06F 21/51* (2013.01)
(Continued)

(52) U.S. Cl.
CPC ............ *G06F 21/52* (2013.01); *G06F 21/121* (2013.01); *G06F 21/51* (2013.01); *G06F 21/575* (2013.01)

(58) Field of Classification Search
CPC ........ G06F 21/52; G06F 21/121; G06F 21/51; G06F 21/575
(Continued)

(56) References Cited

U.S. PATENT DOCUMENTS 6,205,527 B1 *  3/2001  Goshey ............... G06F 11/1461
                                          714/E11.121
10,395,066 B1 *  8/2019  Radulov ............... G06F 21/629
(Continued)

FOREIGN PATENT DOCUMENTS

JP      2020-086469 A      6/2020
WO   WO-2012075323 A1 *   6/2012  ............. G06F 21/51

*Primary Examiner* — Farid Homayounmehr
*Assistant Examiner* — Thanh T Le
(74) *Attorney, Agent, or Firm* — Canon U.S.A., Inc. IP Division

(57) ABSTRACT

An information processing apparatus includes a rewrite request receiving unit configured to receive a rewrite request for rewriting an execution module, an update module determination unit configured to determine whether an update module that issues the rewrite request is an authorized module, a first falsification detection unit configured to detect falsification of a whitelist, an unauthorized-rewriting prevention unit configured to prevent unauthorized rewriting while maintaining a function of the information processing apparatus by rejecting the rewrite request without stopping the function of the information processing apparatus, in a case where the execution module for which the rewrite request is issued is registered in a whitelist for which the first falsification detection unit determines that no falsification is made and where the rewrite request is issued by an update module for which the update module determination unit determines to be an unauthorized update module.

10 Claims, 12 Drawing Sheets

(51) Int. Cl.
*G06F 21/57* (2013.01)
*G06F 21/12* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 10,645,073 | B1* | 5/2020 | Agarmore | G06F 21/30 |
| 2002/0062455 | A1* | 5/2002 | Lee | G06F 1/3203 |
| | | | | 713/323 |
| 2006/0075216 | A1* | 4/2006 | Vaha-Sipila | G06F 21/575 |
| | | | | 713/2 |
| 2007/0079373 | A1* | 4/2007 | Gassoway | G06F 21/51 |
| | | | | 726/22 |
| 2009/0013409 | A1* | 1/2009 | Wenzinger | G06F 21/575 |
| | | | | 726/24 |
| 2009/0063840 | A1* | 3/2009 | Ogawa | G06F 11/1417 |
| | | | | 713/2 |
| 2009/0282284 | A1* | 11/2009 | Naohiro | G06F 11/2028 |
| | | | | 714/E11.023 |
| 2010/0185845 | A1* | 7/2010 | Takayama | G06F 21/575 |
| | | | | 713/189 |
| 2015/0309879 | A1* | 10/2015 | Yasukawa | G06F 11/1415 |
| | | | | 714/19 |
| 2017/0223024 | A1* | 8/2017 | Desai | H04L 63/029 |
| 2019/0311115 | A1* | 10/2019 | Lavi | G06F 21/554 |
| 2020/0092374 | A1* | 3/2020 | Mehta | H04L 67/125 |
| 2020/0104476 | A1* | 4/2020 | Radulov | G06F 21/83 |

\* cited by examiner

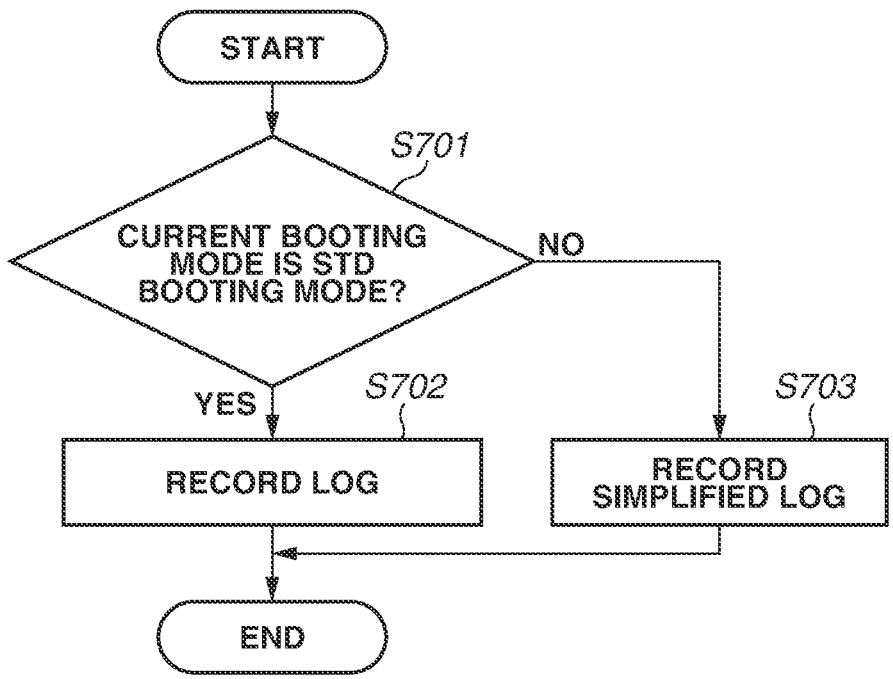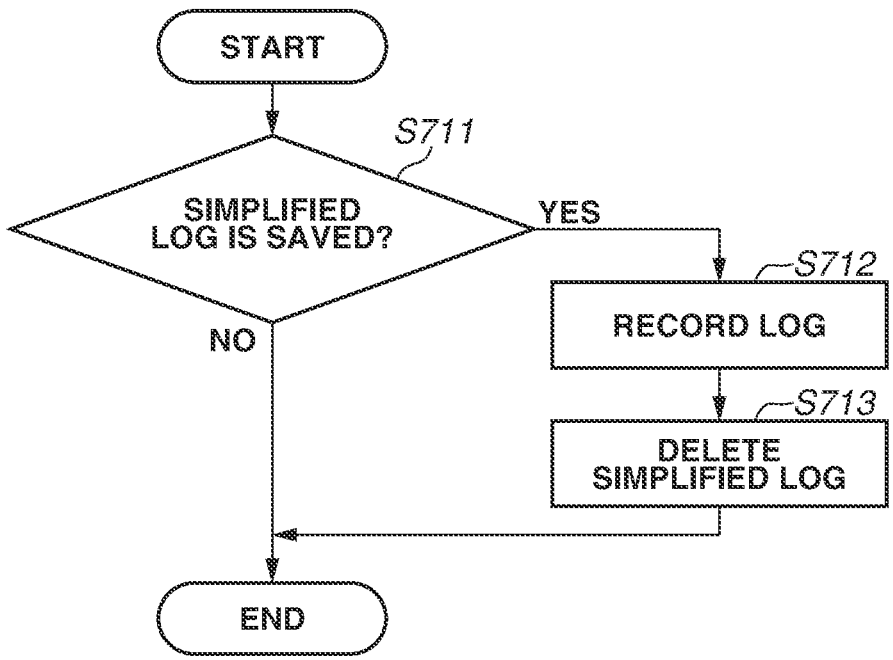

INFORMATION PROCESSING APPARATUS, INFORMATION PROCESSING METHOD, AND STORAGE MEDIUM FOR PREVENTING UNAUTHORIZED REWRITING OF A MODULE

BACKGROUND OF THE INVENTION

Field of the Invention

The present invention relates to an information processing apparatus and an information processing method for preventing unauthorized rewriting of an execution module.

Description of the Related Art

Attacks have been an issue that are attempts, made by a third party, to steal an information asset in an information processing apparatus by unauthorizedly falsifying a program (hereinafter, also referred to as "module" or "execution module") controlling the information processing apparatus or attempts to use an information processing apparatus with a falsified module as a stepping-stone. In order to prevent such attacks and to protect a module in the information processing apparatus from being falsified (unauthorizedly rewritten) by the third party, there is provided a method for preventing unauthorized action itself, unauthorized rewriting of a module, by the third party.

In Japanese Patent Application No. 2018-214138, when an execution request for executing a module is received, a hash value of the module is calculated and compared with a hash value described in a whitelist. The module is booted only if the calculated hash value conforms to the described hash value, thus preventing the booting of a module which has been falsified. The whitelist is a list of modules permitted to be booted, and a normal hash value of respective modules is saved as a correct hash value, which is used for detecting falsification of the modules. In a case where falsification is detected in a module or an expansion JAVA (registered trademark) application which is not registered in the whitelist, the information processing apparatus only prohibits execution of the module or the application without stopping the system. Thus, the user can use the information processing apparatus continuously. For the other modules, the normal operation of the system is affected, and thus the system and the operation are stopped.

Japanese Patent Application No. 2018-214138 however discusses merely the operation rate for a case where falsification is detected when the module is executed, and does not particularly discuss the operation rate for a case where unauthorized rewriting is prevented. If the technique discussed in Japanese Patent Application No. 2018-214138 is directly applied to error processing in unauthorized-rewriting prevention, the operation rate decreases and the functions are degraded because the system is stopped and the execution of the modules is prohibited through the error processing, even though falsification of a module is prevented through the unauthorized rewriting prevention processing.

SUMMARY OF THE INVENTION

According to an aspect of the present invention, an information processing apparatus that prevents unauthorized rewriting of an execution module by using a whitelist during operation includes a rewrite request receiving unit configured to receive a rewrite request for rewriting the execution module, an update module determination unit configured to determine whether an update module that issues the rewrite request is an authorized module, a first falsification detection unit configured to detect falsification of the whitelist, an unauthorized-rewriting prevention unit configured to prevent unauthorized rewriting while maintaining a function of the information processing apparatus by rejecting the rewrite request without stopping the function of the information processing apparatus, in a case where the execution module for which the rewrite request is issued is registered in a whitelist for which the first falsification detection unit determines that no falsification is made and where the rewrite request is issued by an update module for which the update module determination unit determines to be an unauthorized update module, and a notification unit configured to notify a user of execution of prevention when unauthorized rewriting is prevented by the unauthorized-rewriting prevention unit.

Further features of the present invention will become apparent from the following description of exemplary embodiments with reference to the attached drawings.

BRIEF DESCRIPTION OF THE DRAWINGS

FIGS. 7A and 7B are flowcharts illustrating processing executed by the MFP according to a variation example 1 of the first exemplary embodiment.

DESCRIPTION OF THE EMBODIMENTS

Hereinafter, exemplary embodiments of an information processing according to the present invention will be described in detail with reference to the accompanying drawings. The present exemplary embodiment will be described with respect to unauthorized-rewriting prevention processing for enabling an information processing apparatus to prevent a third party from rewriting (falsifying) a module and control processing of the information processing apparatus when the prevention processing is executed. In the present exemplary embodiment, a multifunctional peripheral (MFP) serving as an image forming apparatus will be described as an example of the information processing apparatus. However, a technique described in the present invention is also applicable to an information processing apparatus other than the MFP.

Apparatus Configuration of First Exemplary Embodiment

Figure 1:
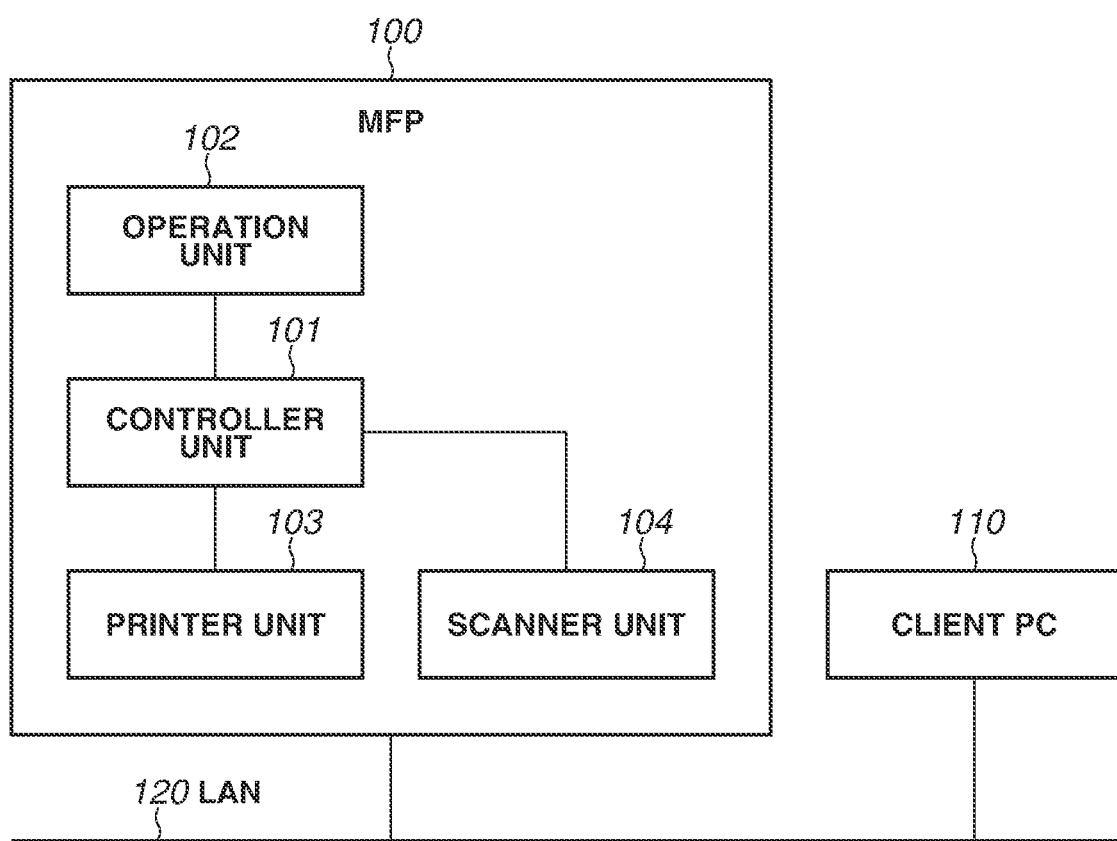
FIG. 1 is a block diagram illustrating a connection state of a multifunction peripheral (MFP) and a personal computer (PC).

A first exemplary embodiment of the present invention will be described below. A connection of an MFP and a client personal computer (PC) will be described with reference to a block diagram in FIG. 1.

An MFP 100 and a client PC 110 are connected to each other via a local area network (LAN) 120. The MFP 100 includes an operation unit 102 for outputting and receiving data to/from a user. The MFP 100 includes a printer unit 103 for outputting electronic data to a printing medium. The MFP 100 includes a scanner unit 104 which reads a printing medium and converts the resultant into electronic data. The operation unit 102, the printer unit 103, and the scanner unit 104 are connected to a controller unit 101, and realize functions of the MFP 100 under the control of the controller unit 101. The client PC 110 executes processing for transmitting a print job to the MFP 100.

Figure 2:
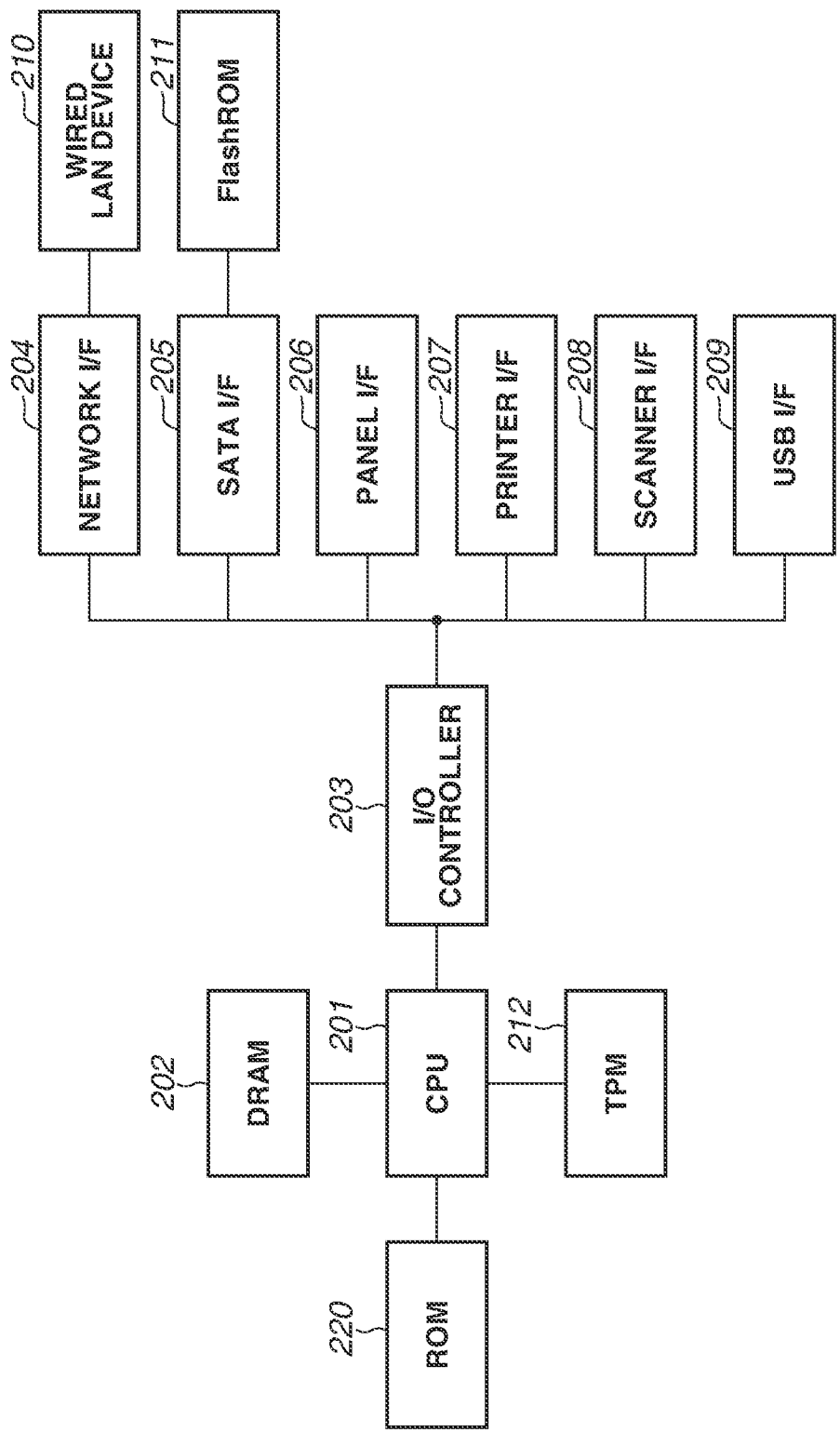
FIG. 2 is a block diagram illustrating an internal configuration of a controller unit of the MFP according to a first exemplary embodiment.

FIG. 2 is a block diagram illustrating details of the controller unit 101 of the MFP 100. A central processing unit (CPU) 201 executes main calculation processing in the controller unit 101. The CPU 201 is connected to a dynamic random access memory (DRAM) 202 via a bus. The CPU 201 uses the DRAM 202 as a work memory for temporarily storing program data representing calculation commands or processing target data in the process of calculation of the CPU 201. The CPU 201 is connected to an input-output (I/O) controller 203 via the bus. The I/O controller 203 executes input-output processing with respect to various devices according to an instruction of the CPU 201. The I/O controller 203 is connected to a serial advanced technology attachment (SATA) interface (I/F) 205, and a flash read only memory (ROM) 211 is further connected to the SATA I/F 205. The CPU 201 uses the flash ROM 211 to permanently store programs and document files used for realizing the functions of the MFP 100. The I/O controller 203 is connected to a network I/F 204, and the network I/F 204 is connected to a wired LAN device 210.

The CPU 201 controls the wired LAN device 210 via the network I/F 204 to execute communication through the LAN 120. The I/O controller 203 is connected to a panel I/F 206, and the CPU 201 implements input and output for a user with the operation unit 102 via the panel I/F 206. The I/O controller 203 is connected to a printer I/F 207, the CPU 201 executes output processing of a printing medium by using the printer unit 103 via the printer I/F 207. The I/O controller 203 is further connected to a scanner I/F 208, the CPU 201 executes reading processing of a document by using the scanner unit 104 via the scanner I/F 208. A universal serial bus (USB) I/F 209 is connected to the I/O controller 203, and the CPU 201 controls an optional device connected to the USB I/F 209. A ROM 220 is connected to the CPU 201 via the bus, and stores a control program for realizing a basic input output system (BIOS) 360 described below in FIG. 3.

To implement a copying function, the CPU 201 reads program data (module data) from the flash ROM 211 to the DRAM 202 via the SATA I/F 205. According to the program (module) read to the DRAM 202, the CPU 201 detects a copying instruction input to the operation unit 102 from the user via the panel I/F 206. When the copying instruction is detected, the CPU 201 receives electronic data about a document from the scanner unit 104 via the scanner I/F 208, and stores the electronic data in the DRAM 202. The CPU 201 executes color conversion processing appropriate for outputting image data on the image data stored in the DRAM 202. The CPU 201 transmits the image data stored in the DRAM 202 to the printer unit 103 via the printer I/F 207, and executes output processing on a printing medium.

In printing of page description language (PDL) data, the client PC 110 provides a printing instruction via the LAN 120. The CPU 201 reads module data into the DRAM 202 from the flash ROM 211 via the SATA I/F 205 and detects the printing instruction via the network I/F 204 according to the module read into the DRAM 202. When a PDL transmission instruction is detected, the CPU 201 receives print data via the network I/F 204 and save the print data in the flash ROM 211 via the SATA I/F 205. When the print data is saved, the CPU 201 loads the print data saved in the flash ROM 211 to the DRAM 202 as image data. The CPU 201 executes color conversion processing appropriate for output on the image data stored in the DRAM 202. The CPU 201 transmits the image data stored in the DRAM 202 to the printer unit 103 via the printer I/F 207, and executes output processing on a printing medium.

A trusted platform module (TPM) 212 is a security chip having tamper resistance. The tamper resistance refers to a characteristic for preventing a third party from easily analyzing data, and protecting its own apparatus by destroying the modules and data internally stored therein if such analysis is attempted. The TPM 212 includes a non-volatile random access memory (NVRAM) and a plurality of platform configuration registers (PCRs). The NVRAM is a non-volatile memory which optional data can be written in and read out from. Each of the PCRs is a volatile memory having a function of saving a hash value of an optional module when the optional module is executed.

Hereinafter, a functional configuration and unauthorized rewriting prevention processing according to the present exemplary embodiment will be described.

Functional Configuration of First Exemplary Embodiment

Figure 3:
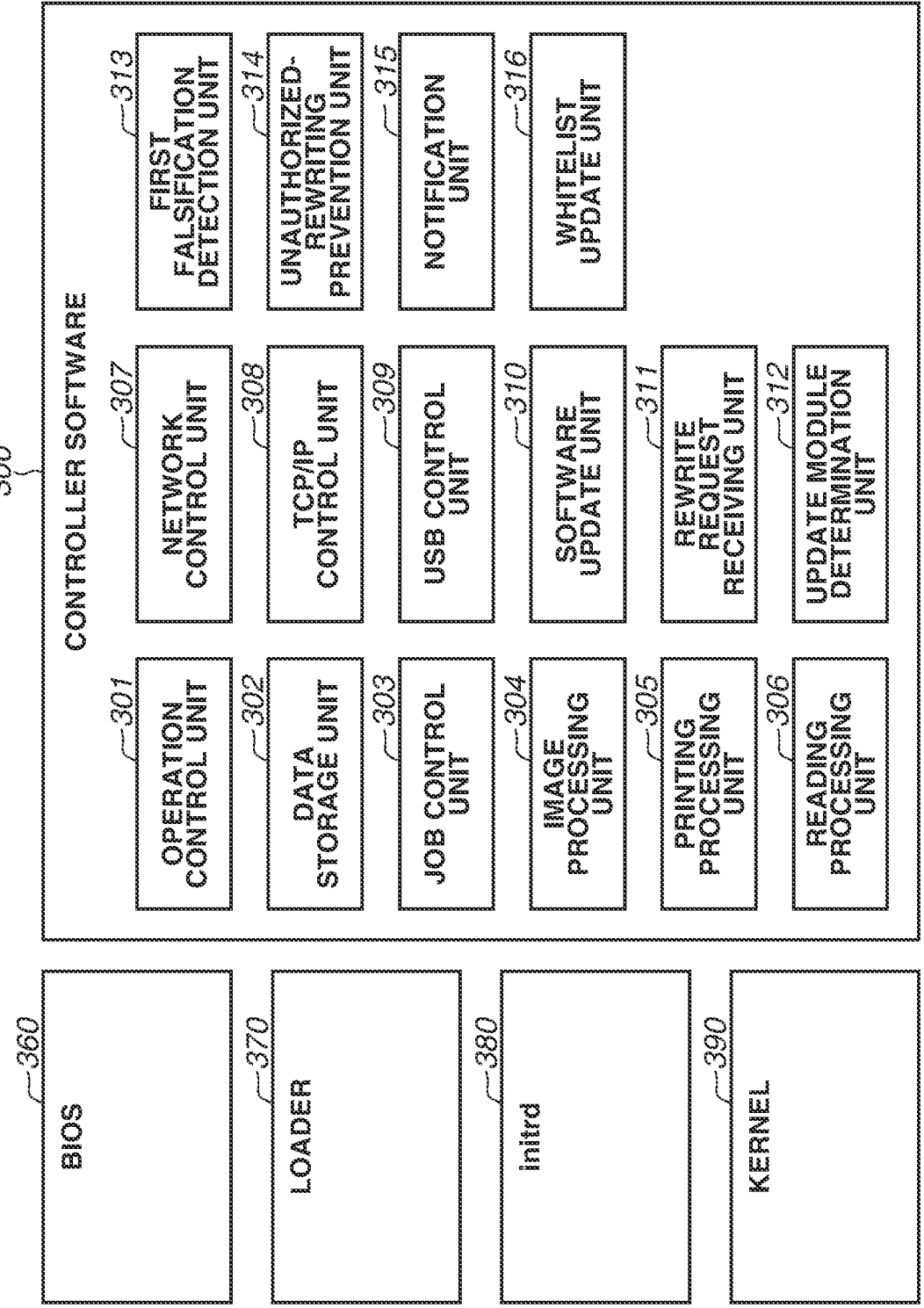
FIG. 3 is a block diagram illustrating a configuration of software executed in the controller unit of the MFP according to the first exemplary embodiment.

An example of a functional configuration which is implemented by the software executed by the controller unit 101 of the MFP 100 of the present exemplary embodiment will be described with reference to FIG. 3. The respective pieces of software executed by the controller unit 101 are executed by the CPU 201.

The CPU 201 executes a BIOS 360 stored in the ROM 220. The CPU 201 executes the BIOS 360 after reading a loader 370, an initial ramdisk (initrd) 380, and controller software 300 stored in the flash ROM 211 to the DRAM 202. The BIOS 360 executes basic processing for causing the CPU 201 to control the I/O controller 203 and the DRAM 202. Processing of the BIOS 360 includes reading the loader 370 from the flash ROM 211 and starting the loader 370. The loader 370 executes processing for reading the initrd 380 and a kernel 390 according to a booting mode (described below) from the flash ROM 211 and starting the initrd 380 and the kernel 390. The initrd 380 executes processing for reading the controller software 300 from the flash ROM 211 and starting the controller software 300.

An operation control unit 301 displays a screen image for the user on the operation unit 102, detects a user operation, and executes processing associated with a screen component, such as a button displayed on the screen.

A data storage unit 302 stores data in the flash ROM 211 and reads data therefrom in response to a request from another control unit. For example, in a case where the user wishes to change a certain device setting, the user performs input on the operation unit 102, the operation control unit 301 detects the input performed by the user, and the data storage unit 302 stores the input as a setting value in the flash ROM 211 in response to a request from the operation control unit 301.

A job control unit 303 executes control of job execution according to an instruction from another control unit.

An image processing unit 304 processes image data into a format appropriate for the purpose of use according to an instruction from the job control unit 303.

A printing processing unit 305 prints an image on a printing medium via the printer I/F 207 according to an instruction from the job control unit 303 and outputs the resultant.

A reading processing unit 306 reads a placed document via the scanner I/F 208 according to an instruction from the job control unit 303.

When the system is booted or change of setting is detected, a network control unit 307 executes network settings, such as a setting of an internet protocol (IP) address, to a transmission control protocol/internet protocol (TCP/IP) control unit 308 according to setting values stored in the data storage unit 302.

The TCP/IP control unit 308 executes transmission/reception processing of network packets via the network I/F 204 according to an instruction from another control unit.

A USB control unit 309 controls the USB I/F 209 to execute control of an optional device connected via a USB.

Figure 4:
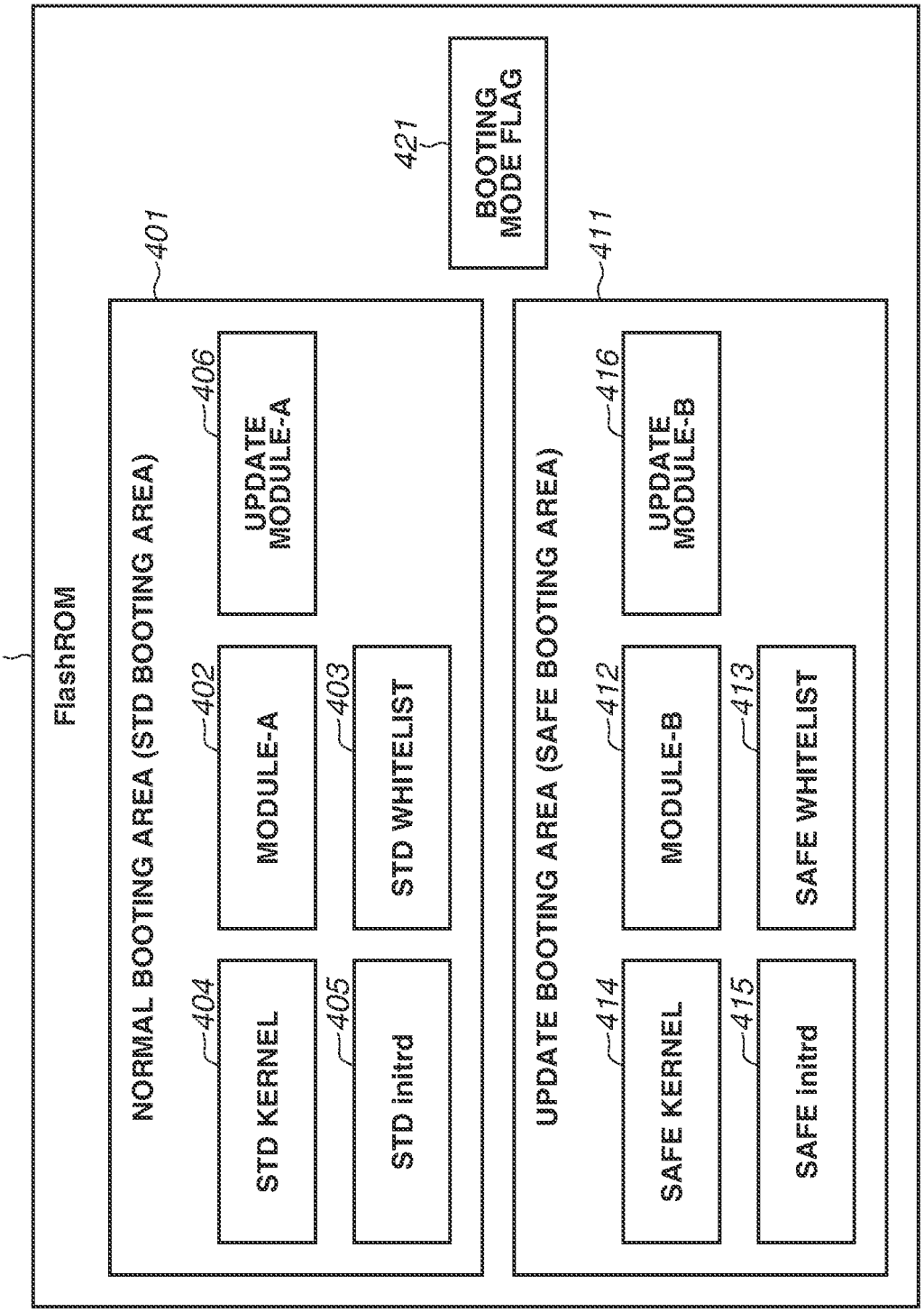
FIG. 4 is a block diagram illustrating examples of data arranged in a flash read only memory (ROM).

A software update unit 310 executes processing for updating a program file constituting the controller software 300 in an installation environment. For example, a module-A 402 and a module-B 412 arranged on the flash ROM 211 (described below) in FIG. 4 are rewritten by the software update unit 310. Specifically, the software update unit 310 rewrites the module-A 402 and the module-B 412 through an update module-A 406 and an update module-B 416 (described below), respectively, which are also arranged on the flash ROM 211 in FIG. 4.

A rewrite request receiving unit 311 receives rewrite requests for the module-A 402 and the module-B 412 (described below) arranged on the flash ROM 211 when the MFP 100 is in an operating state. The rewrite request includes, for example, information about an update module that issues the rewrite request and information about a module related to a rewriting target. Herein, the operating state of the MFP 100 refers to a state where the BIOS 360, the loader 370, the initrd 380, the kernel 390, and the controller software 300 are booted normally, so that functions of the MFP 100 can be provided.

An update module determination unit 312 determines whether the module that issues a rewrite request is an authorized update module. More specifically, only an update module-A 406 and an update module-B 416 (described below), which are arranged on the flash ROM 211 and realize the function of the software update unit 310, are determined to be authorized update modules. The other modules that issue rewrite requests are determined to be unauthorized update modules.

A first falsification detection unit 313 detects falsification of an STD whitelist 403 and a SAFE whitelist 413 arranged on the flash ROM 211 in FIG. 4 described below. Examples of a falsification detection method includes digital signature verification using a known public key encryption algorithm. At this time, the first falsification detection unit 313 can detect falsification of the whitelist by verifying a signature value (signature data) of the whitelist by using a public key which is a signature verification key. In a case where falsification of the whitelist is detected, the first falsification detection unit 313 notifies the user of detection of falsification via a notification unit 315 (described below) and stops the system.

An unauthorized-rewriting prevention unit 314 prevents a module as a protection target described in the whitelist from being rewritten by an unauthorized update module. More specifically, in a case where an update module determined to be an unauthorized update module by the update module determination unit 312 issues a rewrite request of a module as a protection target (a module described in the whitelist), the unauthorized-rewriting prevention unit 314 rejects the rewrite request to prevent unauthorized rewriting. In the whitelist, as illustrated in the examples in FIG. 5, a name of a module and a hash value (correct hash value) of the module in a non-falsified state are listed for each module as a protection target for unauthorized rewriting. A known algorithm, e.g., the secure hash algorithm 256-bit (SHA 256) or the SHA 512 can be used for the hash value. Separate whitelists, the STD whitelist 403 describing the STD modules and the SAFE whitelist 413 describing the SAFE module may be provided, or a single whitelist, such as a whitelist 502, may be provided collectively. As illustrated in a whitelist 501, a whitelist with a modifying word may be provided so that the STD module and the SAFE module can be distinguished from one another. These whitelists are merely examples, and the present exemplary embodiment can be realized with a whitelist which describes only a name of a protection target module.

Figure 12:
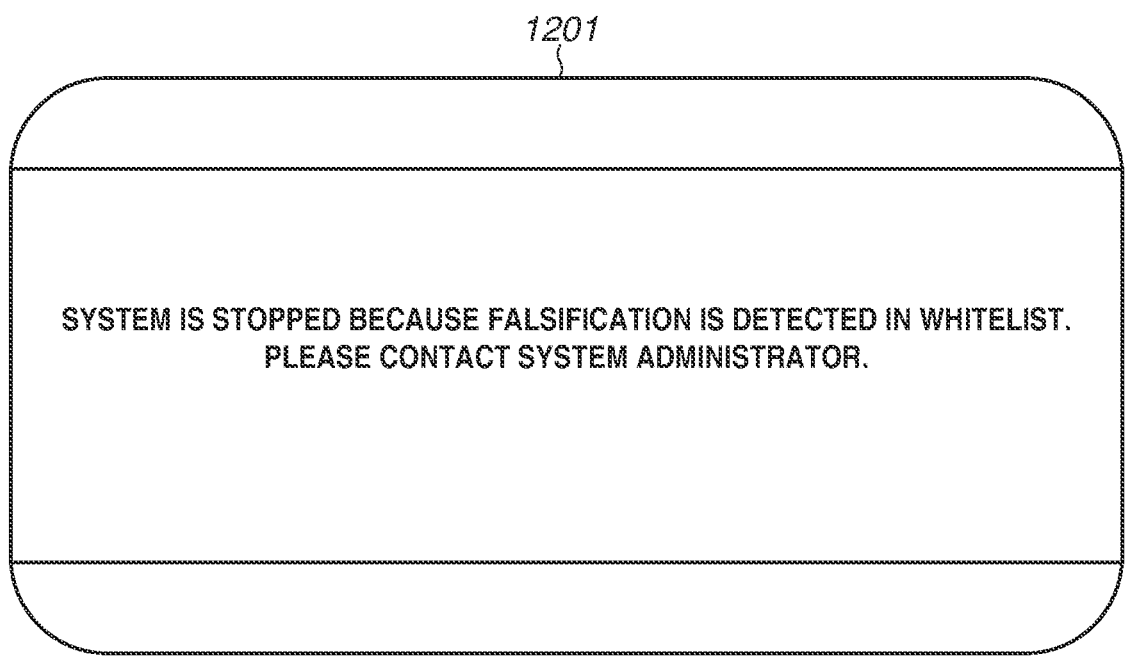
FIG. 12 is a diagram illustrating a configuration of an error screen displayed when a system is stopped.

The notification unit 315 notifies the user of execution of unauthorized rewriting prevention in a case where unauthorized rewriting prevention is performed by the unauthorized-rewriting prevention unit 314. In the notification method, for example, the notification unit 315 firstly records information such as "the name of the unauthorized update module that attempts unauthorized rewriting", "the name of the module as a target of unauthorized rewriting", and "the time when unauthorized rewriting is prevented" as a log file for each occurring event. The log file is then recorded and saved in the data storage unit 302 by one row. The recorded and saved log file is transmitted to an external administrative server or displayed on the operation unit 102, so that the administrator can recognize that unauthorized rewriting is attempted by the third party. In a case where falsification of the whitelist is detected by the first falsification detection unit 313, the notification of the detection is also provided to the user. In the notification method, as in the case where unauthorized rewriting prevention is executed, for example, information such as "the name of whitelist for which falsification is detected" and "the time when falsification is detected" can be recorded and saved as a log file. In the notification method for a case where the system is stopped when falsification of the whitelist is detected, a message indicating stop of the system is displayed on an entire face 1201 of the operation unit 102 as illustrated in FIG. 12. Since the system is stopped, buttons are not displayed thereon, and the message indicating that stop of the system due to detection of falsification is displayed on the entire face 1201.

Figure 5:
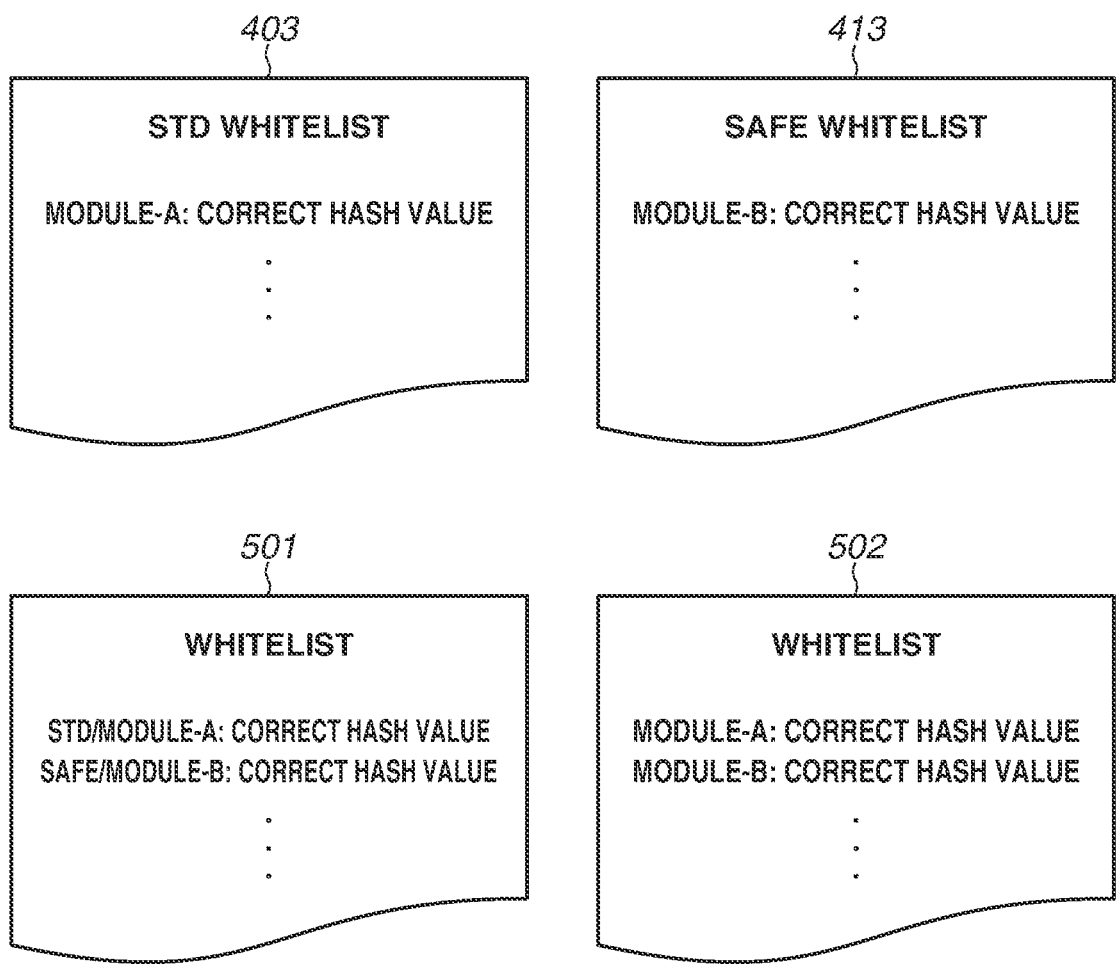
FIG. 5 is a diagram illustrating examples of a whitelist.

In a case where the software update unit 310 updates (rewrites) a module, the whitelist update unit 316 calculates a hash value from the module and updates a correct hash value of the corresponding module described in the whitelist in FIG. 5. With this configuration, a hash value of the module in a normal state included in the MFP 100 and a correct hash value described in the whitelist can conform to each other.

An example of data arranged in the flash ROM 211 is illustrated in FIG. 4.

A usable area in the flash ROM 211 is logically divided into an area for each of booting modes, i.e., a normal booting area (STD booting area) 401, an update booting area (SAFE booting area) 411, and a common area. These booting modes are merely examples, and other booting modes may be provided in addition to the STD booting mode and the SAFE booting mode. In such a case, the area in the flash ROM 211 can be divided accordingly. The STD booting area 401 includes the module-A 402, the STD whitelist 403, an STD kernel 404, an STD initrd 405, and an update module-A 406 (described below). The SAFE booting area 411 includes the module-B 412, the SAFE whitelist 413, a SAFE kernel 414, a SAFE initrd 415, and an update module-B 416 (described below). A booting mode flag 421 saved in the common area is used for determining the current booting mode. For example, the loader 370 reads the booting mode flag 421 and starts executing STD booting by loading the STD kernel 404 and the STD initrd 405 if the booting mode flag 421 represents the STD booting mode. Similarly, if the booting mode flag 421 represents the SAFE booting mode, the loader 370 starts executing SAFE booting by loading the SAFE kernel 414 and the SAFE initrd 415. The module-A 402 includes a module used for STD booting, and functions necessary for STD booting is provided via the MFP 100 by executing the module. Similarly, the module-B 412 includes a module used for SAFE booting, and functions necessary for SAFE booting is provided via the MFP 100 by executing the module. While, in the below-described exemplary embodiment, the module-A 402 is included in the STD booting area 401 and the module-B 412 is included in the SAFE booting area 411, a plurality of modules may be included in addition to the module-A 402 and the module-B 412. As illustrated in FIG. 5, the module-A 402 for the STD booting, which is to be protected from unauthorized rewriting, is described in the STD whitelist 403 together with the correct hash value. Similarly, the module-B 412 for the SAFE booting, which is to be protected from unauthorized rewriting, is described in the SAFE whitelist 413 together with the correct hash value as illustrated in FIG. 5. The update module-A 406 rewrites the module-B 412 and the update module-B 416 included in the SAFE booting area 411 in the STD booting mode, thus updating these modules. The update module-B 416 rewrites the module-A 402 and the update module-A 406 included in the STD booting area 401 in the SAFE booting mode, thus updating these modules. In this way, in a case where the module-A 402 and the update module-A 406 in the STD booting area 401 are to be rewritten, the SAFE booting is executed, and the update module-B 416 updates the modules. Thus, modules in another area can be updated without exerting an influence on the operation in the current booting mode. Similarly, in a case where the module in the SAFE booting area 411 is to be rewritten, the STD booting is executed, and then, the update module-A 406 rewrites the module, thus safely updating modules in another area (i.e., the module-B 412 and the update module-B 416).

Processing in First Exemplary Embodiment

Figure 6A:
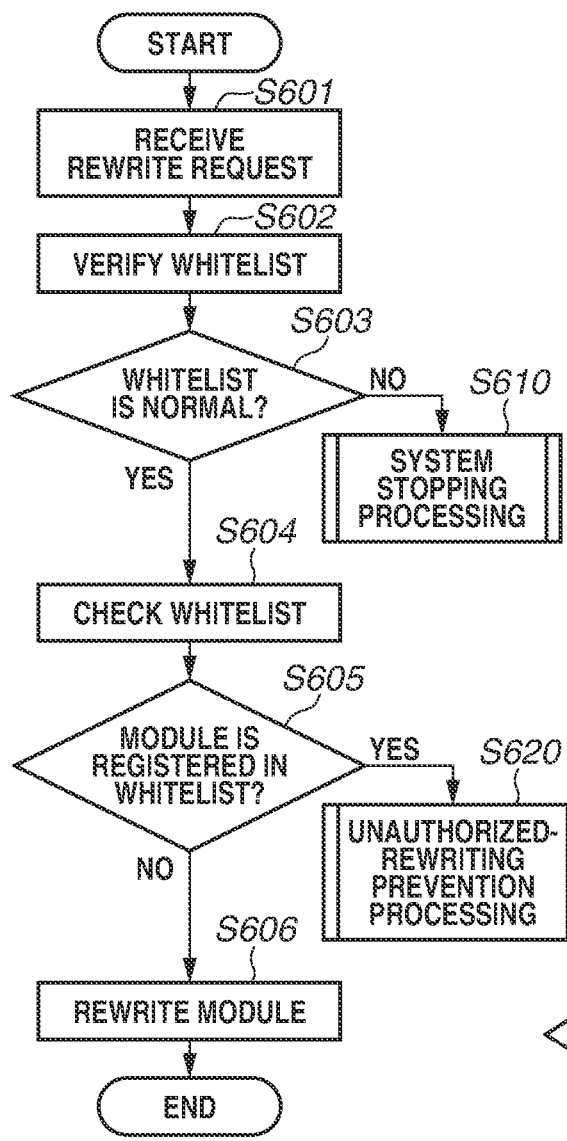
FIGS. 6A to 6C are flowcharts each illustrating processing executed by the MFP according to the first exemplary embodiment.
Figure 6B:
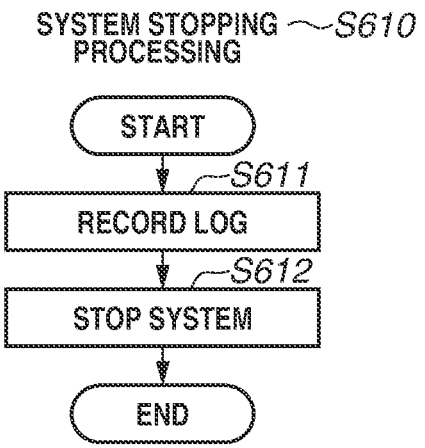
Figure 6C:
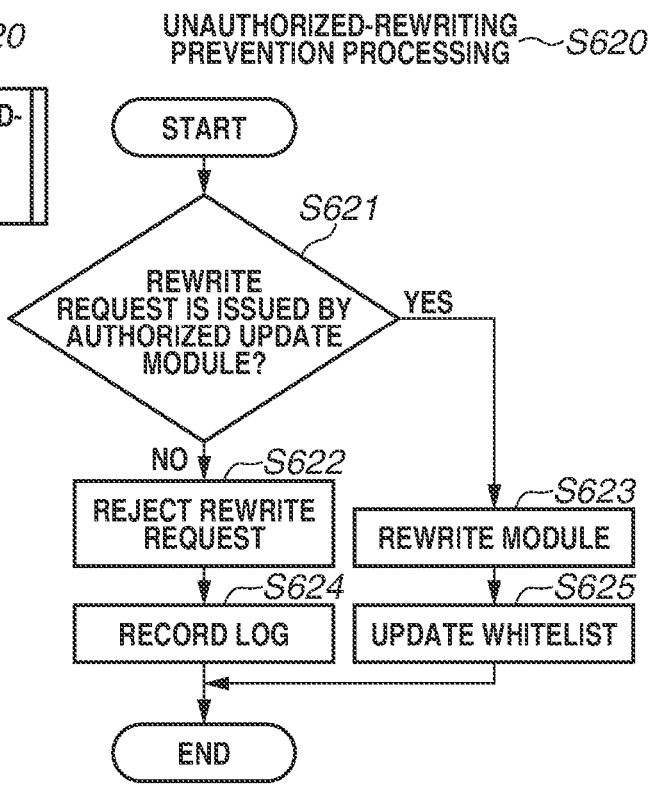

The unauthorized rewriting prevention processing according to the present exemplary embodiment will be described with reference to flowcharts in FIGS. 6A, 6B, and 6C.

In step S601, the rewrite request receiving unit 311 receives a rewrite request for rewriting of a module. In step S602, the first falsification detection unit 313 verifies whether the whitelist is falsified. If falsification of the whitelist is detected, that is, if the whitelist is not normal (NO in step S603), the processing proceeds to step S610, and processing for stopping the system is executed. Specifically, in step S611, the notification unit 315 records a log and performs user notification through a screen displayed on the operation unit 102. In step S612, the system is stopped. If the whitelist is not falsified, that is, if the whitelist is normal (YES in step S603), the processing proceeds to step S604. In step S604, the unauthorized-rewriting prevention unit 314 checks whether the module as a rewriting target is registered in the whitelist, that is, whether the rewriting target module is a protection target. In step S605, if the module is not registered in the whitelist (NO in step S605), the module is determined to be a non-protection target, and the processing proceeds to step S606. In step S606, the software update unit 310 rewrites the module according to the rewrite request. If the rewriting target module is registered in the whitelist (YES in step S605), the processing proceeds to step S620. In step S620, unauthorized rewriting prevention processing is executed. Specifically, in step S621, the update module determination unit 312 determines whether the update module that issues the rewrite request is an authorized module. If the update module determination unit 312 determines that the rewrite request is not issued by an authorized update module (NO in step S621), the processing proceeds to step S622. In step S622, the unauthorized-rewriting prevention unit 314 prevents unauthorized rewriting by rejecting the rewrite request. In step S624, the notification unit 315 records a log indicating the occurrence of unauthorized rewriting attempt and provides the user with a warning sign of an attack. If the update module determination unit 312 determines that the rewrite request is issued by an authorized update module (YES in step S621), the processing proceeds to step S623. In step S623, the software update unit 310 rewrites the module in response to the rewrite request. In step S625, the whitelist update unit 316 updates the whitelist.

In addition, the sequence of processes for recording a log (in step S611) and stopping the system (in step S612), and the sequence of processes for rejecting the rewrite request (in step S622) and recording a log (in step S624) are merely examples, and the sequence thereof may be changed.

As described above, when unauthorized-rewriting prevention processing is executed, since the user is notified of the execution of prevention while the system and the modules are being operated continuously with the system not being stopped in the present exemplary embodiment, decrease in operation rate and the functional degradation can be prevented with the security secured, and predictive information about the attack can be further notified to the user.

Variation Example 1 of First Exemplary Embodiment

The above-described SAFE booting mode is an emergency booting mode used when a module for STD booting is updated or the STD booting cannot be operated normally. Thus, in many cases, the functions usable in the SAFE booting mode are limited in comparison to the case of the STD booting mode. In the present variation example, a user notification method will be described for a case where unauthorized rewriting is prevented in the SAFE booting mode in which the notification unit 315 cannot use a recording function of a log because of functional limitation.

In the present variation example, in a case where unauthorized rewriting is prevented in the SAFE booting mode, the unauthorized-rewriting prevention unit 314 records a simplified log because recording of a log is not executable by the notification unit 315 due to the above-described functional limitation. Recording of a simplified log refers to recording of a text file describing information such as "the name of the unauthorized update module that attempts unauthorized rewriting", "the name of the module as a target of unauthorized rewriting", and "the time when unauthorized rewriting is prevented" by one row for each event. This text file is also referred to as a simplified log. The simplified log recording can be executed by saving the text file in the data storage unit 302. In addition, it is possible to determine whether the current booting mode is the STD booting mode or the SAFE booting mode by reading the above-described booting mode flag 421.

In the present variation example, the notification unit 315 further includes the function of checking the presence of a saved simplified log in the STD booting mode. If a simplified log is saved, the notification unit 315 records the information included in the simplified log in a log file managed by the notification unit 315 to realize transmission of a log file to the management server and a user notification function, such as display on the operation unit 102. The notification unit 315 deletes the simplified log after recording the log.

Processing in the present variation example will be described with reference to FIGS. 6C, 7A, and 7B. Description of processes approximately similar to those described in the first exemplary embodiment will be omitted. In a case where unauthorized rewriting is prevented in step S622, in step S701, the unauthorized-rewriting prevention unit 314 determines whether the current booting mode is the STD booting mode. If the current booting mode is the STD booting mode (YES in step S701), the processing proceeds to step S702. In step S702, the notification unit 315 records a log. If the current booting mode is the SAFE booting mode (NO in step S701), the processing proceeds to step S703. In step S703, the unauthorized-rewriting prevention unit 314 generates a simplified log and saves the generated simplified log. In step S711, when the MFP 100 is booted in the STD booting mode next time, the notification unit 315 checks whether the simplified log is saved. If the simplified log is saved (YES in step S711), the processing proceeds to step S712. The notification unit 315 records a log in step S712 and deletes the simplified log in step S713.

As described above, in the present variation example, a simplified log file is generated in a case where a log cannot be recorded in the SAFE booting mode, and the notification unit 315 officially records the log in the next STD booting mode. With this processing, user notification can be executed even if unauthorized rewriting is prevented in the SAFE booting mode.

Variation Example 2 of First Exemplary Embodiment

In the present variation example, a description will be provided of a method for a user notification which is executed by the notification unit 315 in a case where the flash ROM 211 is not usable due to a failure. In recording a log in a log file, the notification unit 315 according to the first exemplary embodiment saves the log file in the flash ROM 211 via the data storage unit 302. Thus, in a case where the flash ROM 211 is not usable due to a failure, the notification unit 315 cannot record a log, and thus cannot notify the user.

Figure 8A:
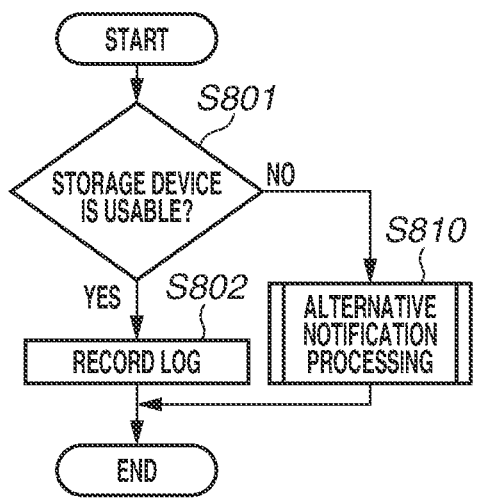
FIGS. 8A to 8E are flowcharts illustrating processing executed by the MFP according to variation examples 2, 3, 4, and 5 of the first exemplary embodiment.
Figure 8D:
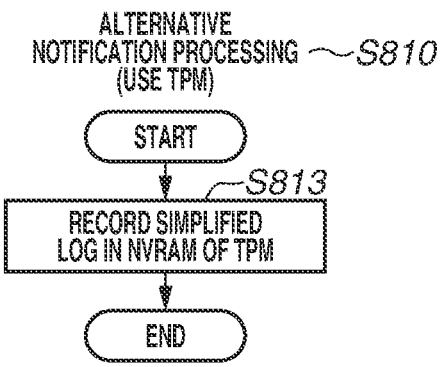
Figure 8B:
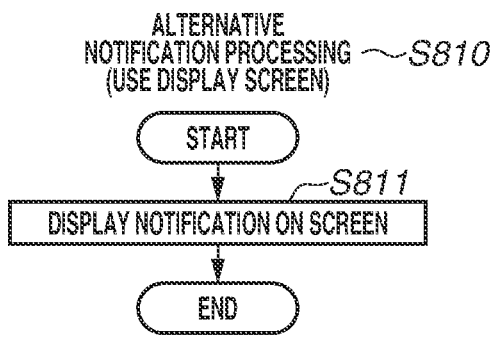
Figure 8E:
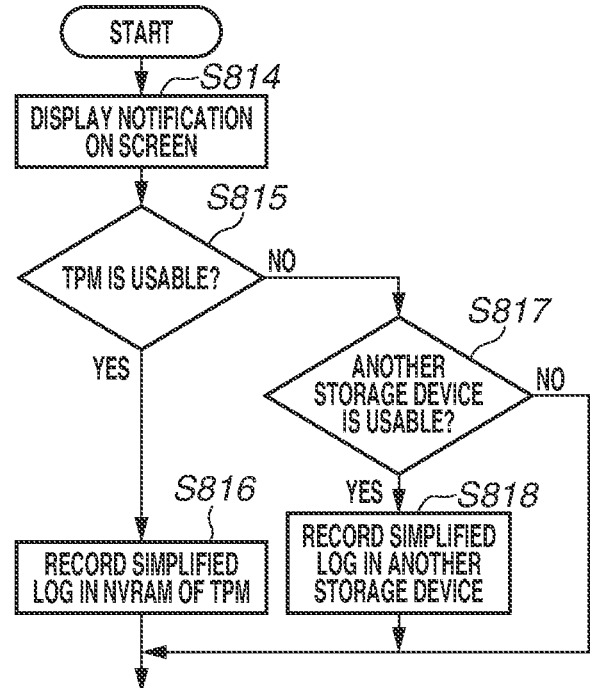
Figure 8C:
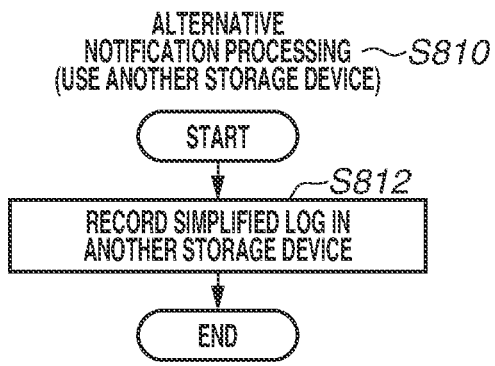
Figure 10:
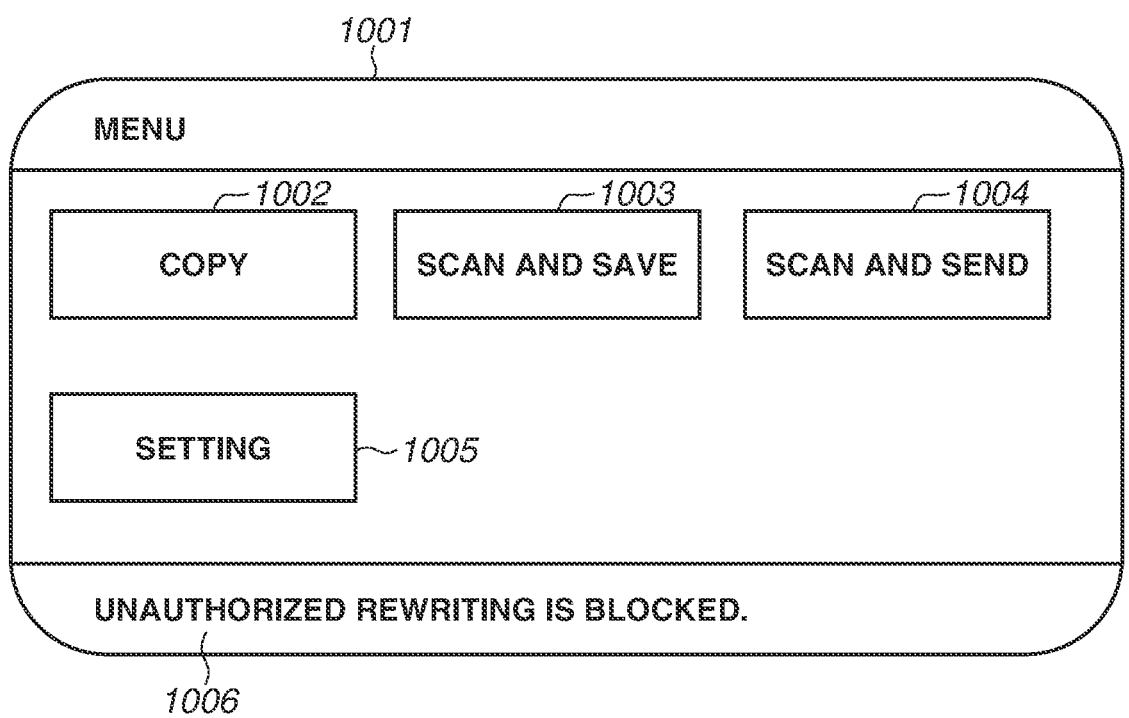
FIG. 10 is a diagram illustrating a configuration of a screen displayed when unauthorized rewriting is prevented.

In the present variation example, the notification unit 315 further includes the function of displaying information indicating execution of unauthorized rewriting prevention on the display area 1006 of the operation unit 102 in FIG. 10 in a case where the flash ROM 211 is not usable because of a failure, so that recording of a log cannot be executed. FIG. 10 illustrates a menu screen 1001 displayed on the operation unit 102, which is used for the user to input instructions to perform various functions provided by the MFP 100. A button 1002 is used for the user to input an instruction to perform the copy function. A button 1003 is used for the user to input an instruction to perform the function of performing scan and saving the scanned data. A button 1004 is used for the user to input an instruction to perform the function of performing scan and transmitting the scanned data. A button 1005 is used for the user to input an instruction to change a device setting. The display area 1006 displays messages indicating various events occurring in the operation of the MFP 100 for the user. The user notification via the operation unit 102 does not use the flash ROM 211. Thus, even if the flash ROM 211 is not usable due to a failure, the notification unit 315 can execute user notification. As an example to determine whether the flash ROM 211 is useable, it is determined that the flash ROM 211 is not usable due to a failure in a case where the notification unit 315 cannot save a log file in the flash ROM 211 because of the occurrence of an error Processing in the present variation example will be described with reference to FIGS. 6C, 8A, and 8B. Descriptions of processes approximately similar to those described in the first exemplary embodiment will be omitted. In a case where unauthorized rewriting is prevented by the unauthorized-rewriting prevention unit 314 in step S622, in step S801, the notification unit 315 determines whether the flash ROM 211 is usable. If the flash ROM 211 is usable (YES in step S801), the processing proceeds to step S802. In step S802, the notification unit 315 records a log via the flash ROM 211. If the flash ROM 211 is not usable (NO in step S801), the processing proceeds to step S810, and alternative notification processing is executed. Specifically, in step S811, the notification unit 315 notifies the user of execution of unauthorized rewriting prevention via a display area 1006 of the operation unit 102.

As described above, in a case where the flash ROM 211 is not usable due to a failure, the user notification is executed via the display area 1006 of the operation unit 102 in the present variation example. With this configuration, the user notification can be executed even if unauthorized rewriting is prevented in a case where a failure occurs in the flash ROM 211.

Variation Example 3 of First Exemplary Embodiment

In the variation example 2 of the first exemplary embodiment, the user is notified through display of information on the operation unit 102 in a case where the flash ROM 211 is not usable. In the present variation example, a method using another storage device will be described. For example, a hard disk drive (HDD) or an embedded multi media card (eMMC) connectable to the SATA I/F 205 is additionally connected to the MFP 100. Thus, these devices can be used as another storage device appropriate for the present variation example. Alternatively, a flash ROM different from the flash ROM 211 may be additionally connected to the MFP 100, so that the additional different flash ROM can also be used as another storage device according to the present variation example.

The present variation example enables the user to be notified using another storage device even in a case where the flash ROM 211 is not usable due to a failure. In the present variation example, in a case where the flash ROM 211 is not usable due to a failure, the notification unit 315 records a log via another usable storage device, thus enabling user notification.

In the present variation example, in a case where a log cannot be recorded because the flash ROM 211 is not usable, the notification unit 315 records a simplified log in another storage device. A method approximately similar to the method described in the variation example 1 can be used for recording a simplified log. In the present variation example, a text file describing a simplified log is saved in a storage device different from the flash ROM 211. Whether or not the flash ROM 211 is useable can be determined through a method similar to the method described in the variation example 2. Further, when the flash ROM 211 becomes usable, the notification unit 315 checks whether the simplified log exists in another storage device. If the simplified log exists, the notification unit 315 records a log and notifies the user as in the method described in the variation example 1.

A processing flow of the present variation example will be described with reference to FIGS. 6C, 8A, 8C, and 7B. Description of the processing approximately similar to the processing described in the first exemplary embodiment will be omitted. In a case where unauthorized rewriting is prevented by the unauthorized-rewriting prevention unit 314 in step S622, in step S801, the notification unit 315 determines whether the flash ROM 211 is usable. If the flash ROM 211 is usable (YES in step S801), the processing proceeds to step S802. In step S802, the notification unit 315 records a log using the flash ROM 211. If the flash ROM 211 is not usable (NO in step S801), the processing proceeds to step S810, and alternative notification processing is executed. Specifically, in step S812, the notification unit 315 records a simplified log in another storage device. If the simplified log exists in another storage device when the flash ROM 211 becomes usable (YES in step S711), the processing proceeds to step S712. The notification unit 315 records a log in step S712, and deletes the simplified log in step S713.

As described above, in the present variation example, in a case where the flash ROM 211 is not usable due to a failure, the notification unit 315 saves a simplified log in another storage device and officially records a log after the flash ROM 211 is recovered. With this configuration, user notification can be executed even in a case where unauthorized rewriting is prevented in a case where a failure occurs in the flash ROM 211.

Variation Example 4 of First Exemplary Embodiment

In the present variation example, a simplified log is saved in the NVRAM of the TPM 212 in a case where the flash ROM 211 is not usable. The simplified log is saved in the NVRAM of the TPM 212 which is a tamper-resistant security chip, and thus, the security according to the present variation example is improved in comparison to the case described in the variation example 3 of the first exemplary embodiment. Through the configuration according to the present variation example, the simplified log cannot be easily falsified, so that it is possible to provide protection against attack which hinders the notification unit 315 from recording a log or executing user notification by falsifying or deleting the simplified log.

In the present variation example, the notification unit 315 records a simplified log in the NVRAM of the TPM 212 in a case where a log cannot be recorded because the flash ROM 211 is not usable. A method approximately similar to the method described in the variation example 1 or 3 can be used for recording a simplified log. A method similar to the method described in the variation example 2 or 3 can be used for determining whether the flash ROM 211 is usable. Further, when the flash ROM 211 becomes usable, the notification unit 315 checks whether the simplified log exists in the NVRAM of the TPM 212 through a method approximately similar to the method described in the variation example 3, and records a log and executes user notification through a method similar to the method described in the variation example 1 or 3 if the simplified log exists.

Processing according to the present variation example will be described with reference to FIGS. 6C, 8A, 8D, and 7B. Descriptions of the processes approximately similar to those described in the first exemplary embodiment will be omitted. In a case where unauthorized rewriting is prevented by the unauthorized-rewriting prevention unit 314 in step S622, in step S801, the notification unit 315 determines whether the flash ROM 211 is usable. If the flash ROM 211 is usable (YES in step S801), the processing proceeds to step S802. In step S802, the notification unit 315 records a log via the flash ROM 211. If the flash ROM 211 is not usable (NO in step S801), the processing proceeds to step S810, and alternative notification processing is executed. Specifically, in step S813, the notification unit 315 records a simplified log in the NVRAM of the TMP 212. If the simplified log exists in the NVRAM of the TPM 212 when the flash ROM 211 becomes usable (YES in step S711), the processing proceeds to step S712. The notification unit 315 records a log in step S712, and deletes the simplified log in step S713.

As described above, in the present variation example, in a case where the flash ROM 211 is not usable because of a failure, the notification unit 315 saves a simplified log in the NVRAM of the TPM 212 and officially records a log after the flash ROM 211 is retrieved. With this configuration, user notification can be executed even in a case where unauthorized rewriting is prevented when a failure occurs in the flash ROM 211. Further, because the simplified log is saved in the NVRAM of the TPM 212 which is a tamper-resistant security chip, it is possible to protect against the attack that falsifies the simplified log.

Variation Example 5 of First Exemplary Embodiment

The alternative notification processing described in each of the variation examples 2, 3, and 4 of the first exemplary embodiment (processing using the display screen, another storage device, or the NVRAM of the TMP), which is executed when a storage device (flash ROM 211) is not usable, can be switched dynamically depending on conditions. Specifically, the notification using the display screen of the operation unit 102 described in the variation example 2 is executed constantly because the method can be used regardless of whether the storage device or the TPM 212 is usable. The use of another storage device and the use of NVRAM of the TPM 212, which are described respectively in the variation examples 3 and 4 as an alternative notification, can be switched depending on whether the corresponding devices and functions are usable. In the present variation example, priority is given to the security, the method using another storage device described in the variation example 3 is used only in a case where the NVRAM of the TPM 212 in the variation example 4 is not usable.

Figure 11:
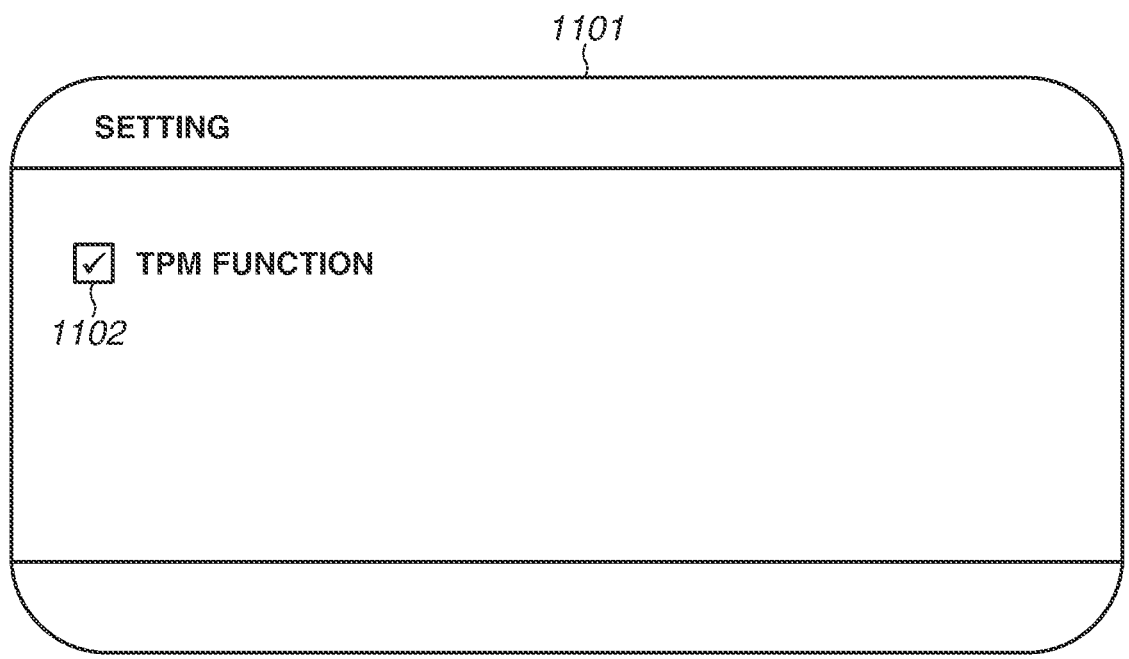
FIG. 11 is a diagram illustrating a configuration of a setting screen according to the variation example 5 of the first exemplary embodiment.

In addition to the functions described in the variation examples 2, 3, and 4, the notification unit 315 according to the present variation example further includes the function of determining whether the TMP 212 is usable, and, if the TMP 212 is useable, saving the simplified log in the NVRAM of the TPM 212 through a method similar to the method in the variation example 4. Further, if the TPM 212 is not usable, the notification unit 315 determines whether a storage device different from the flash ROM 211 is usable, and saves the simplified log in the different storage device as in a method similar to the method described in the variation example 2 if a different storage device is usable. Furthermore, when the flash ROM 211 becomes usable, the notification unit 315 checks whether the simplified log exists in the NVRAM of the TPM 212 or the different storage device, and records a log and executes user notification through a method similar to the method described in the variation example 3 or 4 if the simplified log exists. Whether or not the TPM 212 is usable is determined by checking whether a TPM function 1102 in a setting screen 1101 in FIG. 11 is enabled. When the setting button 1005 in FIG. 10 is pressed, a screen displayed on the operation unit 102 is shifted to the setting screen 1101 illustrated in FIG. 11. In a case where the TPM function 1102 is selected as illustrated in FIG. 11, it is determined that the function of saving data in the NVRAM of the TPM 212 is usable.

Processing of the present variation example will be described with reference to FIGS. 6C, 8A, 8E, and 7B. Descriptions of processes approximately similar to those described in the first exemplary embodiment will be omitted. In a case where unauthorized rewriting is prevented by the unauthorized-rewriting prevention unit 314 in step S622, in step S801, the notification unit 315 determines whether the flash ROM 211 is usable. If the flash ROM 211 is usable (YES in step S801), the processing proceeds to step S802. In step S802, the notification unit 315 records a log via the flash ROM 211. If the flash ROM 211 is not usable (NO in step S801), the processing proceeds to step S810, and alternative notification processing is executed. Specifically, in step S814, the notification unit 315 notifies the user that unauthorized rewriting prevention is performed via the display area 1006 of the operation unit 102. In step S815, the notification unit 315 determines whether the TPM 212 is usable. If the TPM 212 is usable (YES in step S815), the processing proceeds to step S816. In step S816, the notification unit 315 records a simplified log in the NVRAM of the TPM 212. If the TPM 212 is not usable (NO in step S815), the processing proceeds to step S817. In step S817, the notification unit 315 determines whether another storage device is usable. If another storage device is usable (YES in step S817), the processing proceeds to step S818. In step S818, the notification unit 315 records the simplified log in another device. In step S817, if another device is not usable (NO in step S817), the processing is ended directly. If the simplified log exists in the NVRAM of the TPM 212 or another storage device when the flash ROM 211 becomes usable (YES in step S711), the processing proceeds to step S712. The notification unit 315 records a log in step S712, and deletes the simplified log in step S713.

In the present variation example, since priority is given to the security, the NVRAM of the TPM 212 is preferentially used. Alternatively, a different storage device may preferentially be used. For example, since the NVRAM of the TPM 212 normally has a limited storage capacity of tens of Megabyte, priority is given to the available capacity, and a different storage device generally having a sufficient capacity may preferentially be used. In such a case, the notification unit 315 firstly determines whether the different storage device is usable, and uses the NVRAM of the TPM 212 only in a case where the different device is not usable.

As described above, in the present variation example, in a case where the flash ROM 211 is not usable due to a failure, the user notification method is changed depending on conditions, and then the user notification is performed. This configuration enables user notification by using a usable method even in a case where unauthorized rewriting is prevented in a case where a failure occurs in the flash ROM 211.

Variation Example 6 of First Exemplary Embodiment

In the first exemplary embodiment, if the update module determination unit 312 determines that a module is an authorized update module in step S621, rewriting of a target module is then executed in step S623. In the present variation example, falsification detection of the target module is executed before the target module is rewritten in step S623. According to the present variation example, falsification can also be detected when the module is rewritten, so that malware can be found at an early stage of processing.

In the present variation example, the unauthorized-rewriting prevention unit 314 further includes the function of detecting falsification of a rewriting target module by using a whitelist in a case where the update module determination unit 312 determines that a rewrite request is issued by an authorized update module. More specifically, the unauthorized-rewriting prevention unit 314 calculates a hash value of the module as a rewriting target, and compares the calculated hash value with a correct hash value for the module described in the whitelists 403 and 413. As a result of the comparison, if the hash values conform to each other, the software update unit 310 is allowed to rewrite the corresponding module. If the hash values do not conform to each other, the unauthorized-rewriting prevention unit 314 determines that the module is falsified, the notification unit 315 records a log indicating the occurrence of falsification in the module, and then, the system is stopped.

Figure 9:
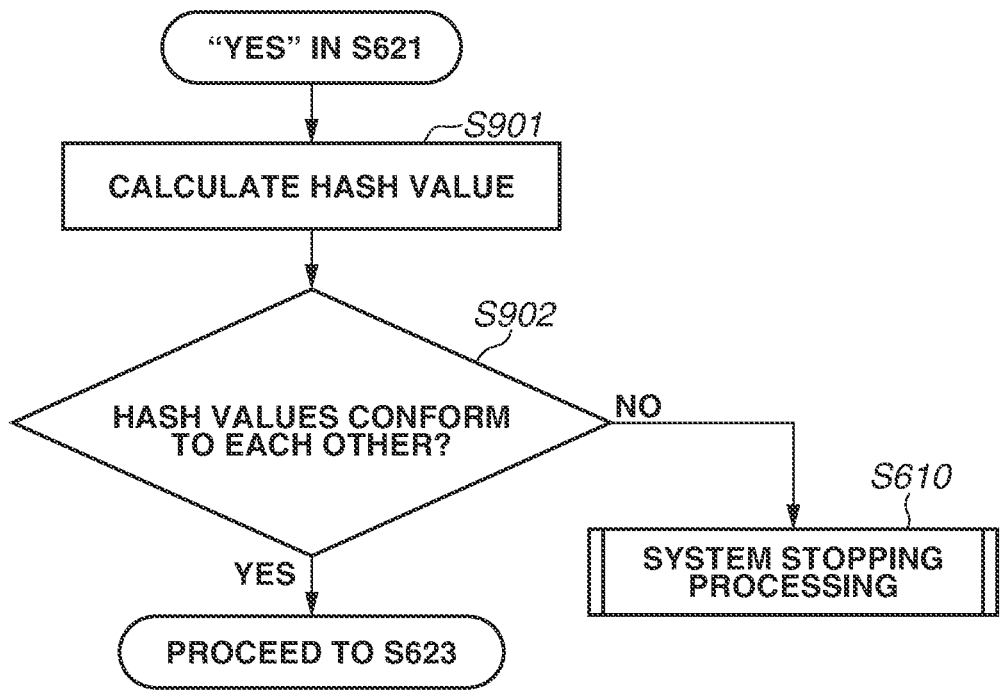
FIG. 9 is a flowchart illustrating processing executed by the MFP according to a variation example 6 of the first exemplary embodiment.

Processing of the present variation example will be described with reference to FIG. 6C and FIG. 9. Descriptions of processes approximately similar to the processing described in the first exemplary embodiment will be omitted. In step S621, the update module determination unit 312 determines whether the update module that issues a rewrite request is an authorized module. If the update module determination unit 312 determines that the rewrite request is issued by an authorized update module (YES in step S621), the processing proceeds to step S901. In step S901, the unauthorized-rewriting prevention unit 314 calculates a hash value of the module as a rewriting target of the rewrite request. In step S902, the unauthorized-rewriting prevention unit 314 compares the calculated hash value with a correct hash value described in the whitelist. If the hash values conform to each other (YES in step S902), the processing proceeds to step S623. In step S623, the software update unit 310 rewrites the target module. In step S625, the whitelist update unit 316 updates the whitelist. If the hash values do not conform to each other (NO in step S902), the processing proceeds to step S610. Through the processes in steps S610, S611, and S612, a log is recorded and the system is stopped.

As described above, falsification can also be detected when the module is rewritten, so that malware can be found at an early stage of processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-120326, filed Jun. 27, 2019, which is hereby incorporated by reference herein in its entirety.

What is claimed is:

1. An information processing apparatus that prevents unauthorized rewriting of an execution module by using a whitelist during operation, the information processing apparatus comprising:
   one or more memories storing instructions; and
   one or more processors coupled to the one or more memories,
   wherein execution of the instructions causes the one or more processors to function as:
      a rewrite request receiving unit configured to receive a rewrite request for rewriting the execution module;
      an update module determination unit configured to determine whether an update module that issues the rewrite request is an authorized module;
      a first falsification detection unit configured to detect falsification of the whitelist;
      an unauthorized-rewriting prevention unit configured to prevent unauthorized rewriting while maintaining a function of the information processing apparatus by rejecting the rewrite request without stopping the function of the information processing apparatus, in a case where the execution module for which the rewrite request is issued is registered in a whitelist for which the first falsification detection unit determines that no falsification is made and where the rewrite request is issued by an update module for which the update module determination unit determines to be an unauthorized update module; and
      a notification unit configured to notify a user of execution of prevention when unauthorized rewriting is prevented by the unauthorized-rewriting prevention unit.

2. The information processing apparatus according to claim 1, wherein the execution of the instructions causes the one or more processors to further function as a first saving device,
   wherein, when the rewrite request is rejected by the unauthorized-rewriting prevention unit, the notification unit notifies the user of execution of unauthorized rewriting prevention by recording information about execution of unauthorized rewriting prevention as a log in the first saving device.

3. The information processing apparatus according to claim 2, further comprising a first booting mode as a normal booting mode and a second booting mode as a limited function mode,
   wherein the notification unit further records the information about execution of unauthorized rewriting prevention in a case where unauthorized rewriting is prevented when the information processing apparatus is booted in the second booting mode, and notifies the user of execution of unauthorized rewriting prevention by officially recording a log based on the information in a case where the information exists when the information processing apparatus is booted in the first booting mode.

4. The information processing apparatus according to claim 2, wherein, in a case where a log cannot be recorded in the first saving device when unauthorized rewriting is prevented, the notification unit further notifies the user of execution of unauthorized rewriting prevention by displaying information on a screen.

5. The information processing apparatus according to claim 2, wherein the execution of the instructions causes the one or more processors to further function as a second saving device,
   wherein, in a case where a log cannot be recorded in the first saving device when unauthorized rewriting is prevented, the notification unit further records the information about execution of unauthorized rewriting prevention as a log in the second saving device.

6. The information processing apparatus according to claim 2, further comprising a tamper-resistant security chip having a non-volatile memory,
   wherein, in a case where a log cannot be recorded in the first saving device when unauthorized rewriting is prevented, the notification unit further records the information about execution of unauthorized rewriting prevention as a log in the non-volatile memory of the security chip.

7. The information processing apparatus according to claim 4, wherein, in a case where a log cannot be recorded in the first saving device when unauthorized rewriting is prevented, the notification unit displays the information about execution of unauthorized rewriting prevention on the screen and further records the information about execution of unauthorized rewriting prevention as a log in the non-volatile memory of the security chip or the second saving device depending on whether the tamper-resistant security chip is useable and whether the second saving device is useable.

8. The information processing apparatus according to claim 1, wherein, in a case where the update module determination unit determines that an update module is an authorized update module, the unauthorized-rewriting prevention unit further detects falsification of the execution module by comparing a hash value of the execution module with a hash value described in the whitelist.

9. An information processing method for preventing unauthorized rewriting of an execution module by using a whitelist during operation, the information processing method comprising:
receiving a rewrite request for rewriting the execution module;
determining, as update module determining, whether an update module that issues the rewrite request is an authorized module;
detecting, as first falsification detecting, falsification of the whitelist;
preventing unauthorized rewriting while maintaining a function by rejecting the rewrite request, in a case where the execution module for which the rewrite request is issued is registered in a whitelist for which it is determined in the first falsification detecting that no falsification is made and where the rewrite request is issued by an update module for which it is determined, in the update module determining, to be an unauthorized update module; and
notifying a user of execution of prevention when unauthorized rewriting is prevented in the preventing.

10. A non-transitory computer-readable storage medium storing a program causing a computer to execute an information processing method, the information processing method comprising:
receiving a rewrite request for rewriting the execution module;
determining, as update module determining, whether an update module that issues the rewrite request is an authorized module;
detecting, as first falsification detecting, falsification of the whitelist;
preventing unauthorized rewriting while maintaining a function by rejecting the rewrite request, in a case where the execution module for which the rewrite request is issued is registered in a whitelist for which it is determined in the first falsification detecting that no falsification is made and where the rewrite request is issued by an update module for which it is determined, in the update module determining, to be an unauthorized update module; and
notifying a user of execution of prevention when unauthorized rewriting is prevented in the preventing.

* * * * *